United States Patent
Abushanab et al.

(10) Patent No.: US 8,255,420 B2
(45) Date of Patent: Aug. 28, 2012

(54) DISTRIBUTED STORAGE

(75) Inventors: Samy Khalil Abushanab, Jeddah (SA); Sami Hussain Salem Al-Attas, Jeddah (SA); Muammer Mustafa Alireza, Jeddah (SA)

(73) Assignee: Noryan Holding Corporation (VG)

( * ) Notice: Subject to any disclaimer, the term of this patent is extended or adjusted under 35 U.S.C. 154(b) by 0 days.

(21) Appl. No.: 11/439,784

(22) Filed: May 23, 2006

(65) Prior Publication Data
US 2007/0276838 A1 Nov. 29, 2007

(51) Int. Cl.
*G06F 17/30* (2006.01)
(52) U.S. Cl. ........ 707/791; 707/601; 707/602; 707/608; 707/802; 707/828
(58) Field of Classification Search ........... 707/600–899
See application file for complete search history.

(56) References Cited

U.S. PATENT DOCUMENTS

| | | | |
|---|---|---|---|
| 5,873,085 A | 2/1999 | Enoki et al. | |
| 6,697,795 B2 | 2/2004 | Holcomb | |
| 6,895,591 B1 | 5/2005 | Russ et al. | |
| 7,386,694 B1 * | 6/2008 | Bezbaruah et al. | 711/162 |
| 2001/0042221 A1 * | 11/2001 | Moulton et al. | 714/5 |
| 2003/0018927 A1 | 1/2003 | Gadir et al. | |
| 2005/0210098 A1 * | 9/2005 | Nakamichi et al. | 709/203 |
| 2005/0246393 A1 | 11/2005 | Coates et al. | |
| 2005/0283649 A1 * | 12/2005 | Turner et al. | 714/6 |
| 2007/0028068 A1 * | 2/2007 | Golding et al. | 711/170 |

FOREIGN PATENT DOCUMENTS

EP 1578088 A2 9/2005

OTHER PUBLICATIONS

Extended European Search Report issued in European Patent Application No. 06114443.2.

* cited by examiner

*Primary Examiner* — Isaac M Woo
(74) *Attorney, Agent, or Firm* — Stroock & Stroock & Lavan LLP

(57) ABSTRACT

A server for managing access to distributed storage comprising a plurality of storage devices includes a file service manager for receiving a request to store a file in the distributed storage and an allocation manager for selecting a cluster within the distributed storage to be used when storing the file. The allocation manager is configured to communicate with at least one other allocation manager in another server so as to determine which allocation manager selects the cluster to be used.

33 Claims, 9 Drawing Sheets

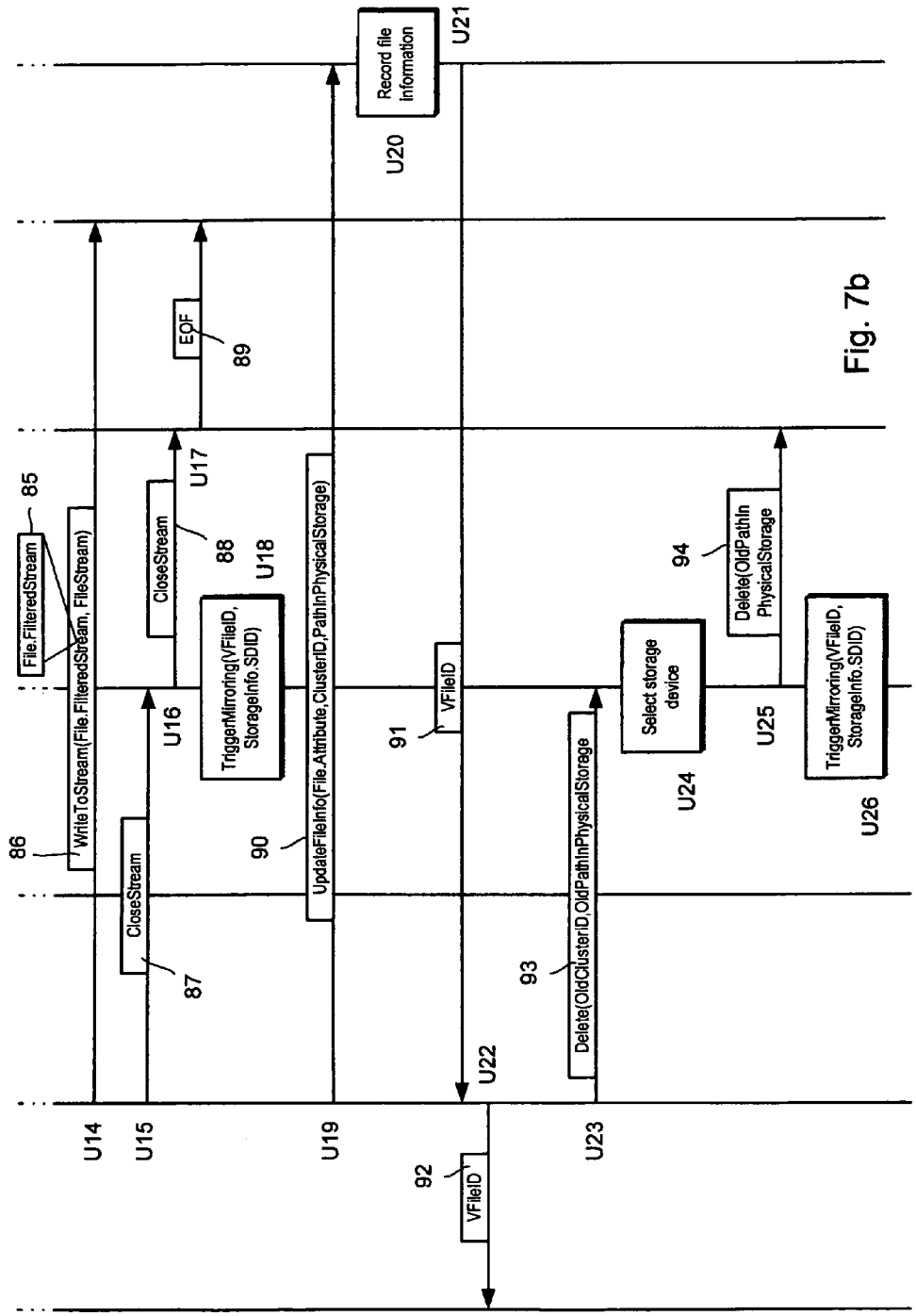

DISTRIBUTED STORAGE

FIELD OF THE INVENTION

The present invention relates to a distributed storage system, to a distributed storage management system and to a server for managing access to distributed storage.

BACKGROUND ART

Demand for data storage for personal and commercial use is ever rising.

For example, as digital recording and playback devices, such as digital cameras and music players, become more popular, then the number of personal users needing to store large amounts of data (e.g. >10 gigabytes) increases. Furthermore, as these devices are used, then the amount of content generated or downloaded accumulates and so the amount of data to be stored also increases.

Requirements for data storage are also changing.

Traditionally, data files, such as digital photographs, have been stored on a storage device, such as a magnetic hard disk, at a single location, for example on a home computer. However, users increasingly want to be able to access their data remotely and even on-the-move. Moreover, users may also want to share their data with other users.

Distributed storage comprising more than one storage device and which is managed using a virtual file system can offer solutions to these problems.

Storage devices can be added to provide additional capacity. Furthermore, to the user, it appears that their data is stored in a single, accessible "location", even though physically the data may be stored disparately across many storage devices, which may even change with time. Also, the user can grant access privileges to other users, such as friends or work colleagues, allowing them to read and even update his or her files.

Conventional distributed storage systems using virtual file systems are known.

U.S. Pat. No. 5,873,085 describes a system having a plurality of servers, each server managing a respective file system and at least one server operating a virtual file management system. The virtual file management system includes a management table storing a virtual file identifier, a server name and a real file name for each virtual file. If a server receives a request from a client to read or modify a specified file and the server does not hold the file, then the server identifies which other server stores the file, modifies the request to instruct the other server to respond directly to the client and forwards the modified request to the other server.

This system suffers the drawback that the servers also store data. This can limit the amount of the storage that can be added to any one server. Adding further servers can provide additional storage, but this is more expensive than simply adding additional storage devices.

US-A-20050246393 describes a network storage system having a virtual file system and a storage cluster having a plurality of intelligent storage nodes and a plurality of control nodes (referred to also as "distributed object storage managers") for identifying and accessing an intelligent storage node storing a specified object file. Each distributed object storage manager maintains a lookup table identifying the location of object files stored in intelligent storage nodes and a state table storing information regarding the overall capacity and health of intelligent storage nodes. The state table is used to select an intelligent storage node to store a new object file. If the network storage system receives a request to store data in a new object file, a load balancing fabric selects one of the distributed object storage managers based on availability and forwards the request to the selected distributed object storage manager. In turn, the distributed object storage manager selects an intelligent storage node.

Different distributed object storage managers are responsible for storing new object files. Thus, each distributed object storage manager only stores information about files for which they are responsible, at least initially. Thus, if a distributed object storage manager receives a request to access a given file for which they are not responsible, then they broadcast a request for the file to the intelligent storage nodes. Therefore, the intelligent storage nodes must be provided with sufficient processing capability to handle such requests. This makes it more difficult to add storage nodes.

The present invention seeks to provide an improved server for managing access to distributed storage and, thus, an improved distributed storage system.

SUMMARY OF THE INVENTION

According to a first aspect of certain embodiments of the present invention there is provided a server for managing access to distributed storage comprising a plurality of storage devices, the server configured to communicate with at least one other server so as to determine which one of the servers selects a portion of distributed storage to be used when storing data.

Thus, a single server controls storing of data which helps to avoid the problem of concurrent allocation of storage and to permit information about the data to be stored orderly in a single metadata server.

The server may comprise a first controller for receiving a request to store data in the distributed storage from a client and a second controller for selecting the portion of the distributed storage to use when storing the data, the second controller configured to communicate with at least one other second controller so as to determine which one of the second controllers selects the portion of distributed storage to use.

The server may be configured, in response to a determination that another server is to select the portion of distributed storage to be used, to receive identity of the portion of the distributed storage from the other server and, in response to a determination that it is to select the portion of distributed storage to be used, to select the portion of distributed storage.

The server may be configured to select one of the storage devices within the portion of the distributed storage.

The server may further comprise a third controller for selecting one of the storage devices within the portion of distributed storage in response to an instruction from the second controller.

The server may be configured, after the file has been stored in the one storage device, to cause the file to be replicated in other storage devices within the portion of the distributed storage. The server may be configured, after the file has been stored, to transmit information relating to the file to a metadata server. The server may be configured to receive a virtual file identifier corresponding to the file from the metadata server and to transmit the virtual file identifier to the client.

The server may be configured, in response to a request to read or update a file, to transmit a request for information relating to the file to any one of at least one metadata server.

At least one of the storage devices may be provided by a remote storage system, such as a storage access network.

According to a second aspect of certain embodiments of the present invention there is provided a server for managing access to distributed storage comprising a plurality of storage devices, the server comprising a file service manager for receiving a request to store data in the distributed storage from a client and an allocation manager for selecting the portion of the distributed storage to be used when storing the data, the allocation manager configured, in response to an instruction from the file service manager, to communicate with at least one other allocation manager, each allocation manager provided by a respective server, so as to determine which one of the allocation managers selects the portion of distributed storage to be used when storing the data.

The server may further comprise a cluster manager, the cluster manager configured, in response to an instruction from the allocation manager, to select one of the storage devices within the portion of distributed storage to store the data.

According to a third aspect of certain embodiments of the present invention there is provided a distributed storage management system comprising a plurality of access managing servers and a metadata server for storing information about files stored in the distributed storage.

The metadata server may be separate from the access-managing servers.

The distributed storage management system may further comprise at least one further metadata server, wherein the access-managing servers are each configured to send information relating to files to the metadata server, but not to the at least one further metadata server. The access-managing servers may each be configured to send requests for information relating to files to any of the at least one further metadata server.

According to a fourth aspect of certain embodiments of the present invention there is provided a distributed storage system comprising a distributed file management system and distributed storage comprising a plurality of storage device.

The storage devices may include plural types of storage device.

According to a fifth aspect of certain embodiments of the present invention there is provided a method of operating a server for managing access to distributed storage comprising a plurality of storage devices, the method comprising communicating with at least one other server so as to determine which one of the servers selects the portion of distributed storage to be used. The method may comprise receiving a request to store data in the distributed storage from a client.

The method may comprise a first controller receiving the request to store data in the distributed storage and a second controller communicating with at least one other second controller so as to determine which one of the second controllers selects the portion of distributed storage to be used.

The method may comprise determining that another server is to select the portion of distributed storage to be used and receiving identity of the portion of the distributed storage to be used from the other server. The method may comprise determining that the server is to select a portion of distributed storage to be used and selecting a portion of the distributed storage to be used. The method may comprise selecting one of the storage devices within the portion of the distributed storage to be used. The method may further comprise storing the data in a selected portion of distributed storage.

The method may comprise, after the file has been stored in the one storage device, causing the file to be replicated in other storage devices within the portion of the distributed storage. The method may comprise transmitting information relating to the file to a metadata server after the file has been stored. The method may comprise receiving a virtual file identifier corresponding to the file from the metadata server and transmitting the virtual file identifier to the client.

The method may further comprise receiving a request to read or update a file and transmitting a request for information relating to the file to any one of at least one metadata server.

According to a sixth aspect of certain embodiments of the present invention there is provided a computer-readable medium storing a computer program comprising instructions which, when executed by a computer, causes the computer to perform the method.

BRIEF DESCRIPTION OF THE DRAWINGS

Embodiments of the present invention will now be described, by way of example, with reference to the accompanying drawings in which:

FIGS. 7a and 7b illustrates a file updating process performed in the system shown in FIG. 4.

DETAILED DESCRIPTION OF EMBODIMENTS OF THE INVENTION

Figure 1:
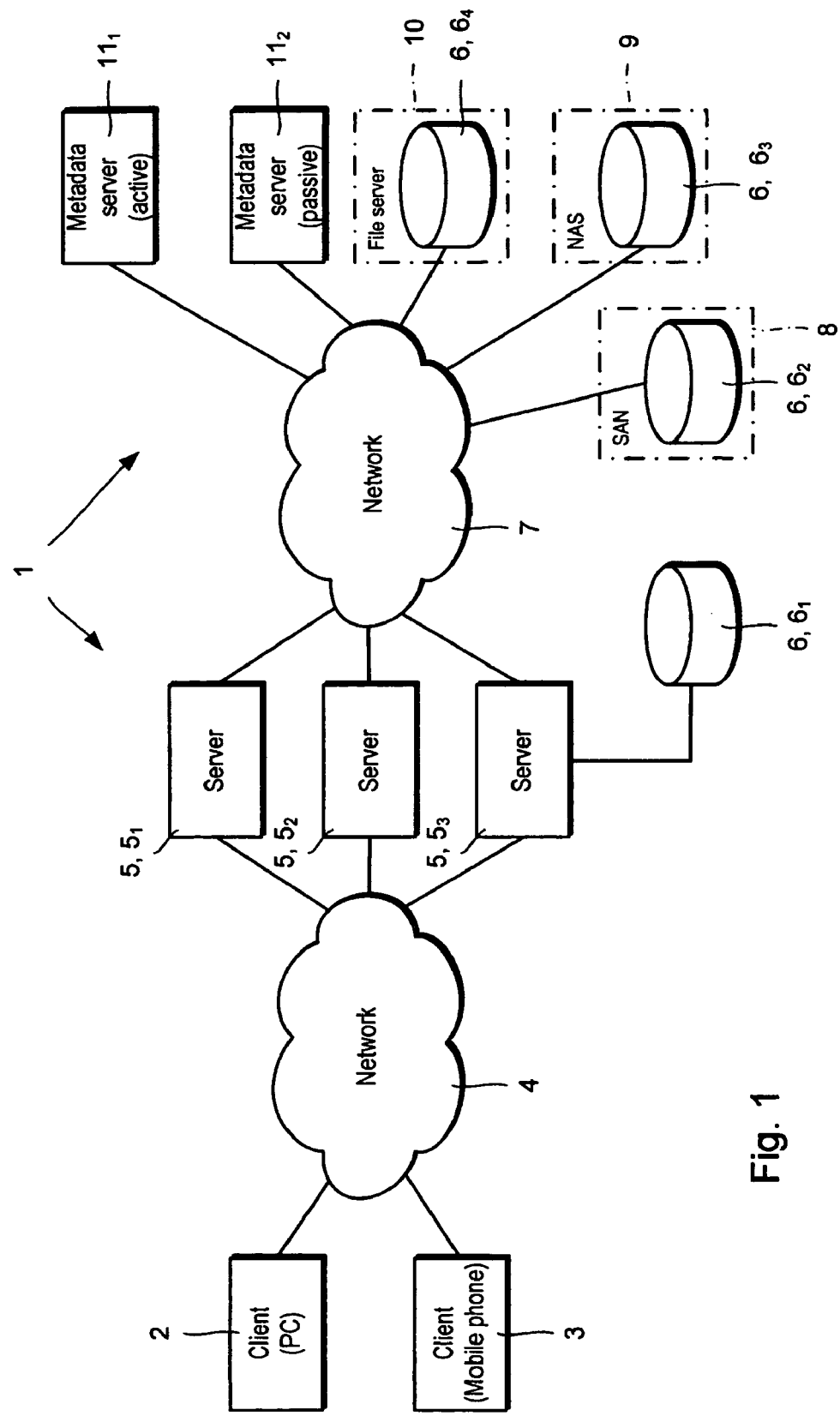
FIG. 1 is schematic diagram of a distributed storage system in accordance with one embodiment of the present invention.

Referring to FIG. 1, a distributed storage system 1 in accordance with one embodiment of the present invention is shown. Clients 2, 3, in this example a desktop personal computer 2 and a mobile telephone handset 3, can access the distributed storage system 1 over a communications network 4, such as the Internet. Although only two clients 2, 3 are shown for clarity, it will be appreciated that one client or more than two clients can access the system 1. The network 4 may include a plurality of wireless and wired networks, including a public land mobile network (not shown) or a wireless local area network (not shown).

The distributed storage system 1 includes first, second and third servers $5_1$, $5_2$, $5_3$ for managing access to distributed storage (the servers $5_1$, $5_2$, $5_3$ are hereinafter referred to as "file service providers"). The system 1 may have fewer, e.g. one or two, or a greater number of file service providers. The file service providers $5_1$, $5_2$, $5_3$ communicate with storage devices 6 locally, such as a first storage device $6_1$ in the form of a hard disk drive provided by the third file service providers $5_3$, or remotely via the communications network 4 or via another communications network 7, such as an Intranet. For example, a storage area network (SAN) 8 may provide a second storage device $6_2$, a network attached storage (NAS) 9 may provide a third storage device $6_3$ and a file server $6_3$ may provide a fourth storage device $6_4$. The number of storage devices 6 may differ. For example, SAN 8 or NAS 9 can provide more than one storage device and/or more than one SAN or NAS may be provided, each providing at least one storage device 6. Other forms of systems providing storage devices 6 can be used, such as common internet file systems (CIFS) (not shown), optical disk (e.g. DVD) drives and USB drives may be used. The number of storage devices 6 may change with time. For example, storage devices 6 may be added or removed. The arrangement of storage devices 6 may also change.

Figure 4:
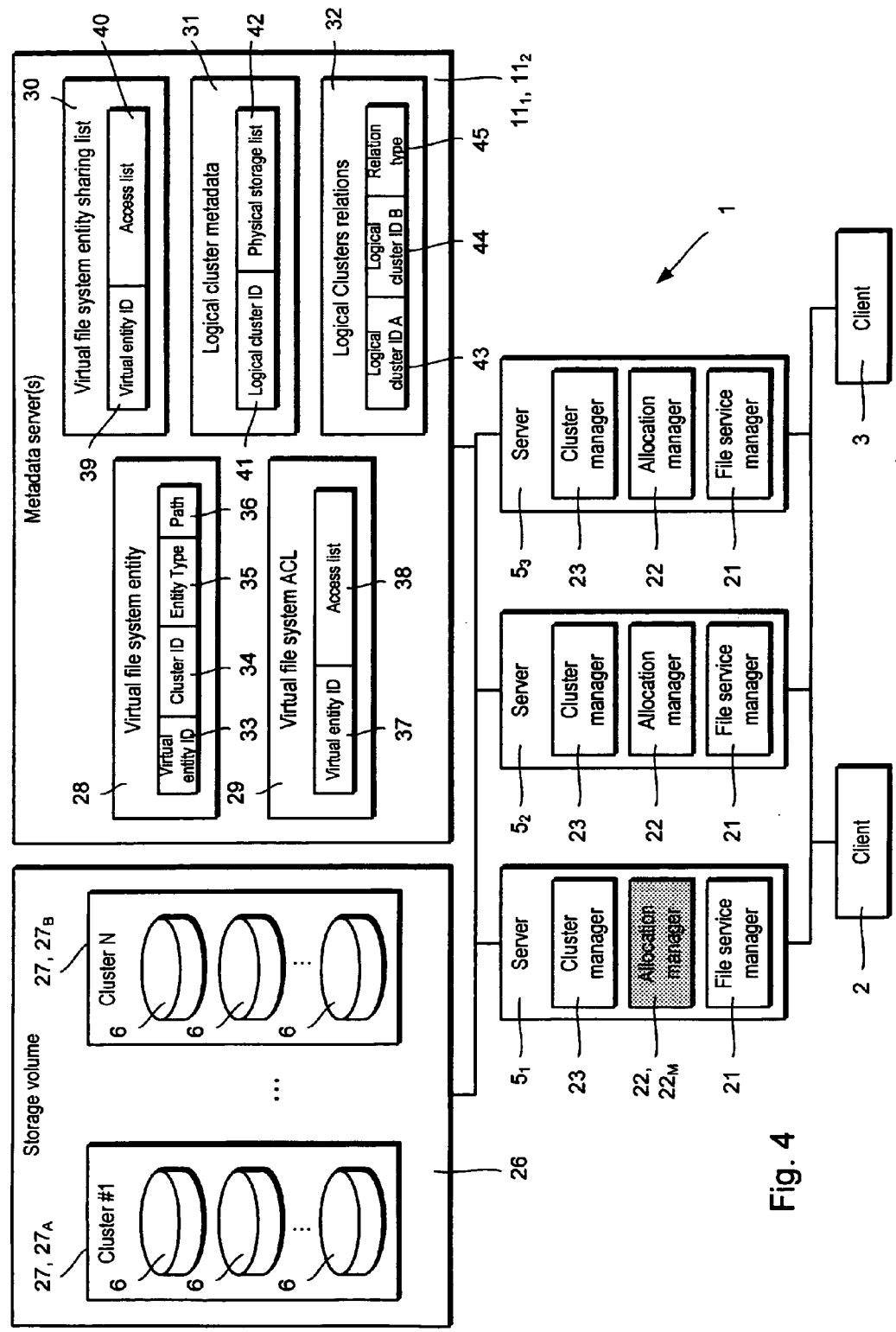
FIG. 4 is a block diagram of the system shown in FIG. 1.

As will be explained in more detail later, the storage devices 6 collectively provide a single storage volume 26 (FIG. 4) and are arranged into clusters 27 (FIG. 4).

The file service providers 5 communicate, via communications network 7, with a first metadata server $11_1$ and an optional second metadata server $11_2$ for mapping between a virtual file reference and a real file. The file service providers 5 can read and write metadata to and from the first metadata server $11_1$. However, the file service providers $5_1$, $5_2$, $5_3$ can only read metadata from the second metadata server $11_2$. The first and second metadata servers $11_1$, $11_2$ are hereinafter referred to as "active" and "passive" metadata servers $11_1$, $11_2$ respectively. The active metadata server $11_1$ may copy metadata to the passive metadata server $11_2$, for example periodically, on demand or in response to predetermined trigger. More than one passive metadata server $11_2$ may be provided. Furthermore, each metadata server $11_1$, $11_2$ may be distributed between two or more servers.

Figure 2:
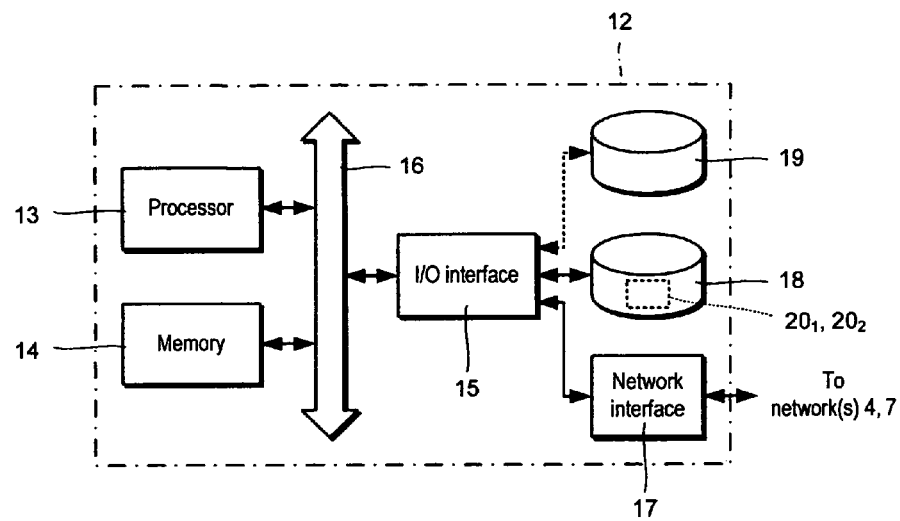
FIG. 2 illustrates a computer system for the servers shown in FIG. 1.

Referring also to FIG. 2, the file service providers 5 and metadata servers 11 are implemented in software on respective computer systems 12. Each computer system 12 includes a processor 13, memory 14 and an input/output (I/O) interface 15 operatively connected by a bus 16. A computer system 12 may include more than one processor. The I/O interface 15 is operatively connected to a network interface 17, storage 18 in the form of a hard disc drive or drives and, optionally, removable storage 19. Other elements, including peripheral devices such as keyboards (not shown) and displays (not shown), may be temporarily or permanently provided.

Computer program codes $20_1$, $20_2$ which, when executed by a computer system 12, causes the computer system 12 to provide file service provider or metadata server processes are stored on the hard drive 18 and loaded into memory 14 for execution by the processor 13. The computer program codes $20_1$, $20_2$ may be stored on and transferred from removable storage 19 or through network interface 17 from a remote source (not shown).

Figure 3:
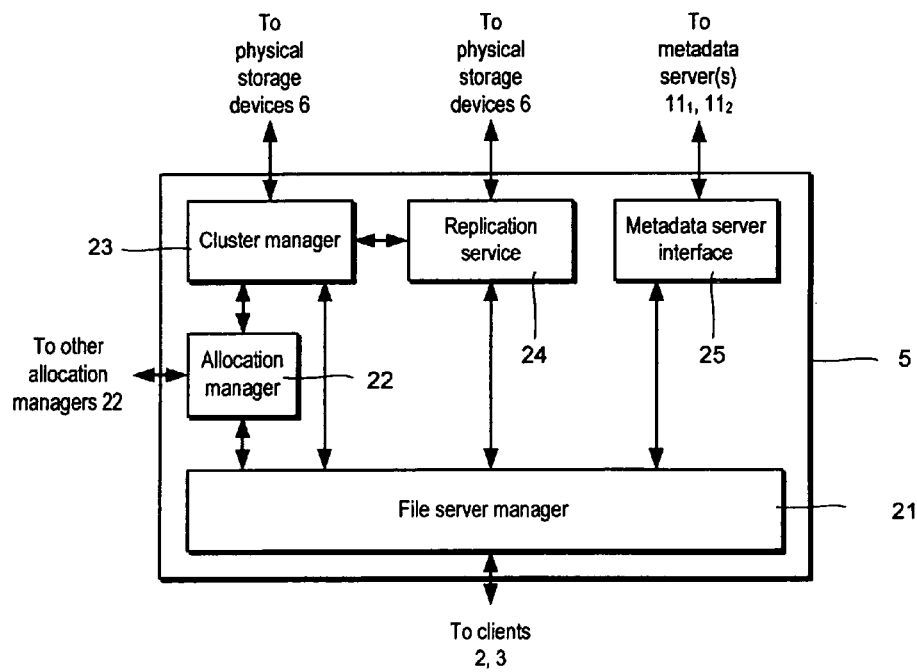
FIG. 3 is a block diagram of a server for managing access to distributed storage.

Referring to FIGS. 1 and 3, each file service provider 5 includes a first service or controller 21 for interfacing with clients 2, 3, a second service or controller 22 for selecting a storage cluster 27 (FIG. 4), a third service or controller 23 for selecting a storage device 6 within a cluster 27 (FIG. 4), a fourth service or controller 24 for controlling replication of data within and between clusters 27 (FIG. 4) and a fifth service or controller 25 for interfacing with the metadata servers $11_1$, $11_2$.

The first service 21 manages requests to access files, such as to write and read files, received from the clients 2, 3 and also manages other components shown in FIG. 3. The first service 21 is herein referred to as a "file service manager".

The second service 22 selects a cluster 27 (FIG. 4) when writing data and is herein referred to as an "allocation manager". As will be described in more detail later, the allocation manager 22 communicates with other allocation managers 22. One allocation manager $22_M$ (FIG. 4), referred to as the "master allocation manager", is chosen to be responsible for selecting clusters 27 (FIG. 4), with the other allocations manager(s) 22 acting as proxies for the master allocation manager $22_M$ (FIG. 4). The chosen allocation manager $22_M$ can change.

In writing or reading processes, the third service 23 selects a storage device 6 and validates its availability. Herein, the third service 22 is referred to as a "cluster manager". The cluster manager 23 triggers replication of a filestream in one storage device 6 to other storage device(s) 6. The cluster manager 23 also distributes a read process between storage devices 6 to increase throughput. The cluster manager 23 also gathers data relating to client-to-storage device throughput. Throughput data can be used, during a writing or reading process, to select storage devices 6 having faster responses to clients 2, 3.

The fourth service 24 is herein referred to as a "replication service". As explained earlier, the replication service 24 controls replication of data within, and between, clusters 27 (FIG. 4). The cluster manager 23 logs replication transactions in case any of the storage devices 6 are not available.

The fifth service 25 is herein referred to as a "metadata server interface". The metadata server interface 25 sends metadata, e.g. information about files, to the active metadata server $11_1$ and retrieves metadata from the active or passive metadata servers $11_1$, $11_2$.

Referring to FIG. 4, the storage devices 6 provide a single storage volume or storage space 26. Storage devices 6 are arranged into clusters 27 in which each storage device 6 stores the same data as another storage device 6 in the same cluster 27, i.e. the storage devices 6 in one cluster 27 are mirrors of one another. Only two clusters 27 are illustrated for clarity. In one cluster 27, the storage devices 6 have different access configurations, for example network addresses. Each file service provider 5 can access at least one storage device 6 in each cluster 27.

The metadata servers $11_1$, $11_2$ store first, second, third, fourth and fifth metadata tables 28, 29, 30, 31, 32. The metadata includes information for mapping virtual file references onto physical file references and attributes of files before filters (such as file compression and virus checks) are applied. The metadata also includes other information such as folder trees, folder content data and also access control lists for each file and folder.

The first table 28 (hereinafter referred to as a "virtual file system entity table") stores a virtual entity identifier 33, a cluster identifier 34, an entity type 35 for each entity, such as a file or directory, and a path in physical storage identifier 36.

The second table 29 (hereinafter referred to as a "virtual file system access control list") stores a virtual entity identifier 37 and an access list 38 for each entity and defines security privileges of users, i.e. client users. The virtual file system access control list 29 lists users who have access privilege to an entity, together with their set of access privileges in relation to the entity, such as read, write, create, delete and change privileges.

Each request to access an entity sent by a client 2, 3 specifies the identity of a user. Therefore, each time a file service provider 5 receives a request to access a given entity, it interrogates the virtual file system access control list 29, for example by retrieving a portion of the list 29 relating to the entity and the user, to verify the user's access privilege.

The third table 30 (hereinafter referred to as a "virtual file system entity sharing list") stores a virtual entity identifier 39 and an access list 40 for each entity and defines access privileges for unregistered users (referred to as "share viewers") which are invited by registered users to share viewing of files. The virtual file system access control list 30 is similar to the virtual file system access control list 29 except that access privileges are usually limited, for example, to read only.

Share viewers are identified and authenticated differently from registered users. Identification and authentication can be performed by external system(s) (not shown) having a trust relationship established with the distributed storage system 1.

The virtual file system access control list 30 may be omitted, for example, if share viewers are not permitted to access the distributed storage system 1.

The fourth table 31 (hereinafter referred to as a "logical cluster metadata table") stores a (logical) cluster identifier 41 and (physical) storage device identifier 42 for each cluster 27. The logical cluster metadata table 31 allows a cluster manager 23 to identify storage devices 6 in a cluster 27.

The fifth table 32 (hereinafter referred to as a "logical clusters relations table") stores a first cluster identifier 43, a second cluster identifier 44 and a relationship type 45 for each cluster 27 and describes relationships between clusters 27. For example, the logical clusters relations table 32 may specify that a first cluster $27_A$ is a replica (i.e. a mirror) of a second cluster $27_B$. Alternatively, the logical clusters relations table 32 may specify that the first cluster $27_A$ is an archive for files stored in the second cluster $27_B$, stored according to predefined criteria. An archive may contain rarely accessed files or files created before a specific date. Thus, a first cluster $27_A$ need not store files which are archived in a second cluster $27_B$. Archived files may be stored in, for example, a tape storage system.

As will be described in more detail hereinafter, the system 1 can be used to provide a file service to clients 2, 3. Requests and responses are exchanged sessionlessly and so different file service providers 5 can handle different requests from the same client 2, 3. Thus, file service providers 5 need not store any information about the state of the client 2, 3. Instead, the client 2, 3 can store information about its state and supply this information when sending a request to a file service provider 5. For example, a request may include authentication information needed to validate a user against access privileges stored in the virtual file system access control list 29.

Writing (Creating File)

Figure 5A:
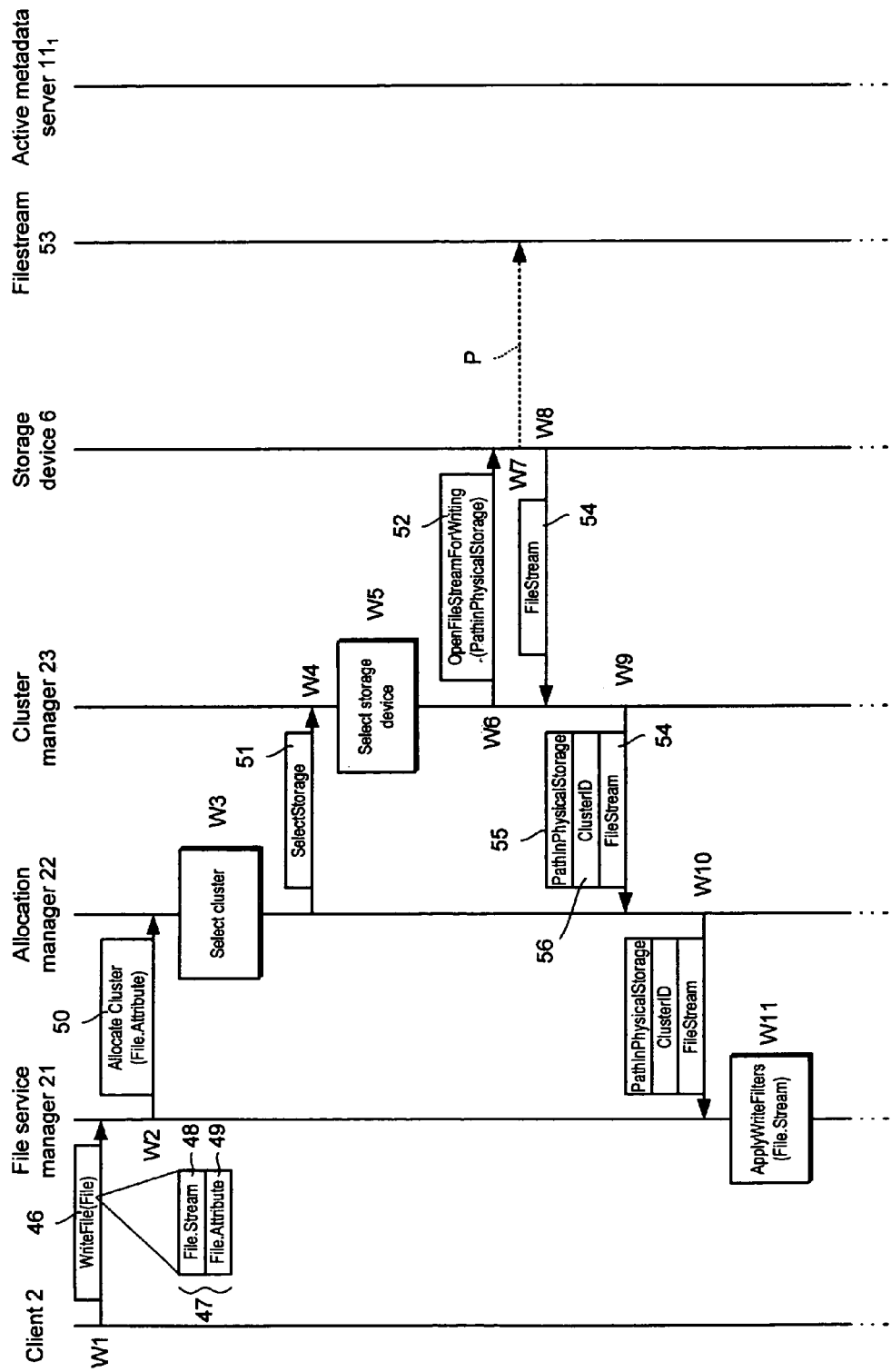
FIGS. 5a and 5b illustrates a file writing process performed in the system shown in FIG. 4.
Figure 5B:
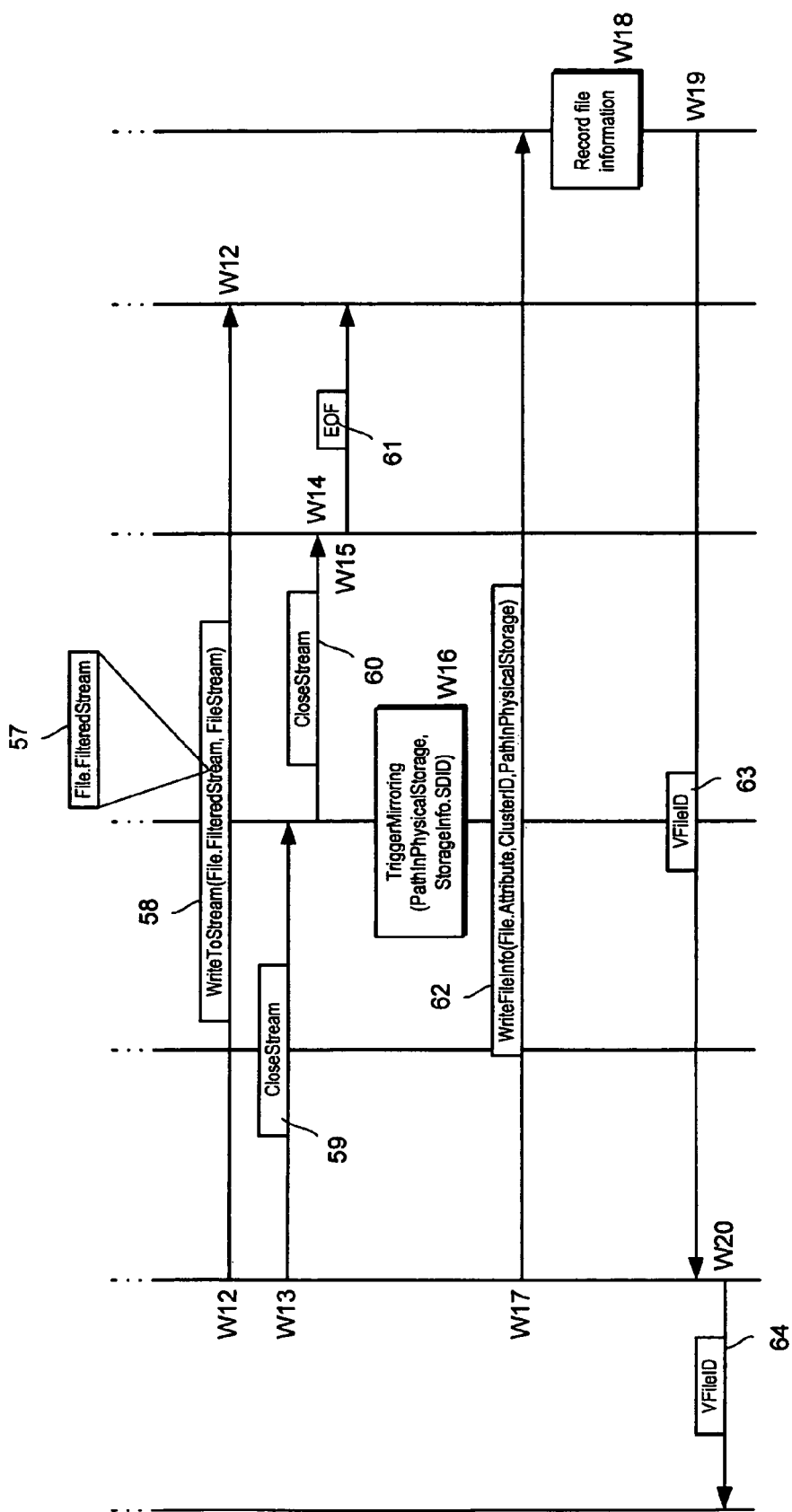

Referring to FIGS. 4, 5a and 5b, a file write process will now be described.

A client, in this example the personal computer 2, sends a file write request 46 to the file service manager 21 of a file service provider 5 (step W1). The file service provider 5 is selected according to a routing mechanism or by load balancers (not shown) in the network 4 (FIG. 1). The file write request 46 includes a file 47 to be written including file data 48 and file attributes 49, such as file type and file size.

The file service manager 21 forwards a cluster allocation request 50 to the allocation manager 22 (step W2). The request 50 may include the file attributes 49 which may used to select a cluster 27.

The master allocation manager $22_M$ selects a cluster 27, for example based on the file attributes 49 and/or cluster attributes and state (not shown), such as available space and percentage of utilization, or on some other basis, such round robin (step W3).

Before a cluster 27 is selected, the allocation manager 22 determines whether it is the master allocation manager $22_M$. If the allocation manager 22 is the master allocation manager $22_M$, then it selects a cluster 27. If not, the allocation manager 22 forwards the request to the master allocation manager $22_M$ which allocates a cluster 27 and returns a cluster identifier.

The allocation manger 22 invokes the cluster manager 23 with an instruction 51 to select a storage device 6 within the selected cluster 27 (step W4). The cluster manager 23 selects a storage device 6 (step W5). The cluster manager 23 makes the selection based on highest network availability between the file service manager 21 and storage devices 6. Network availability can be determined using network state information collected at predetermined times, e.g. periodically, by the allocation manager 22 and by the cluster manager 23.

The cluster manager 23 sends an instruction 52 to the storage device 6 to create a filestream 53 having a given path in the storage device 6 (step W6). The storage device 6 creates a filestream 53 (step W7). A unique file handler is associated with the filestream 53 which points (with pointer P) to a first writable block in the filestream 53 in the storage device 6. The identity 54 of the file handler (which identifies the filestream 53) is returned to the cluster manager 23 (step W8).

The cluster manager 23 returns the file handler identity 54, a path 55 and cluster identity 56 to the allocation manager 22 (step W9), which in turn returns the information to the file service manager 21 (step W10).

The file service manager 21 applies writing filters, such as compression and/or virus checking, to the file data 48 (step W11) and writes filtered file data 57 to the open filestream 53 (step W12). The filestream 53 is filled with filtered file data 57. When a block is filled, the storage device advances the pointer P to point to the next available free block.

Once the filtered file data 57 has been written, the file service manager 21 sends an instruction 59 to the cluster manager 23 to close the filestream 53 (step W13). The cluster manager 23 sends an instruction 60 to the storage device 6 to close the filestream 53 (step W14). The storage device 6 writes an end of file (EOF) marker 61 to the filestream 52 (step W15), frees the pointer and updates the storage system allocation table (not shown), such as a file allocation table provided by the storage device 6.

The cluster manager 23 then triggers replication of the stored filestream 53 in other storage devices 6 in the same cluster 27 by sending an instruction (not shown) to the replication service 24 (FIG. 2) (step W16).

The file service manager 21, via metadata server interface 25, sends an instruction 62 to the metadata server $11_1$ to write metadata into the virtual file system entity table 28, virtual file system access control list 29, virtual file system entity sharing list table 30, logical cluster metadata table 31 and logical clusters relations table 32, as necessary (step W17). The metadata server $11_1$ writes the file information (step W18) and returns a virtual file identifier 63 to the file service manager 21 (step W19). The file service manager 21 sends confirmation 64 to the client 2 that the file has been written including the virtual file identifier 63 (step W20).

As mentioned earlier, the allocation manager 22 determines whether or not it is the master allocation manager $22_M$. A process by which this is achieved will now be described in more detail.

Selecting Master Allocation Manager

Figure 6:
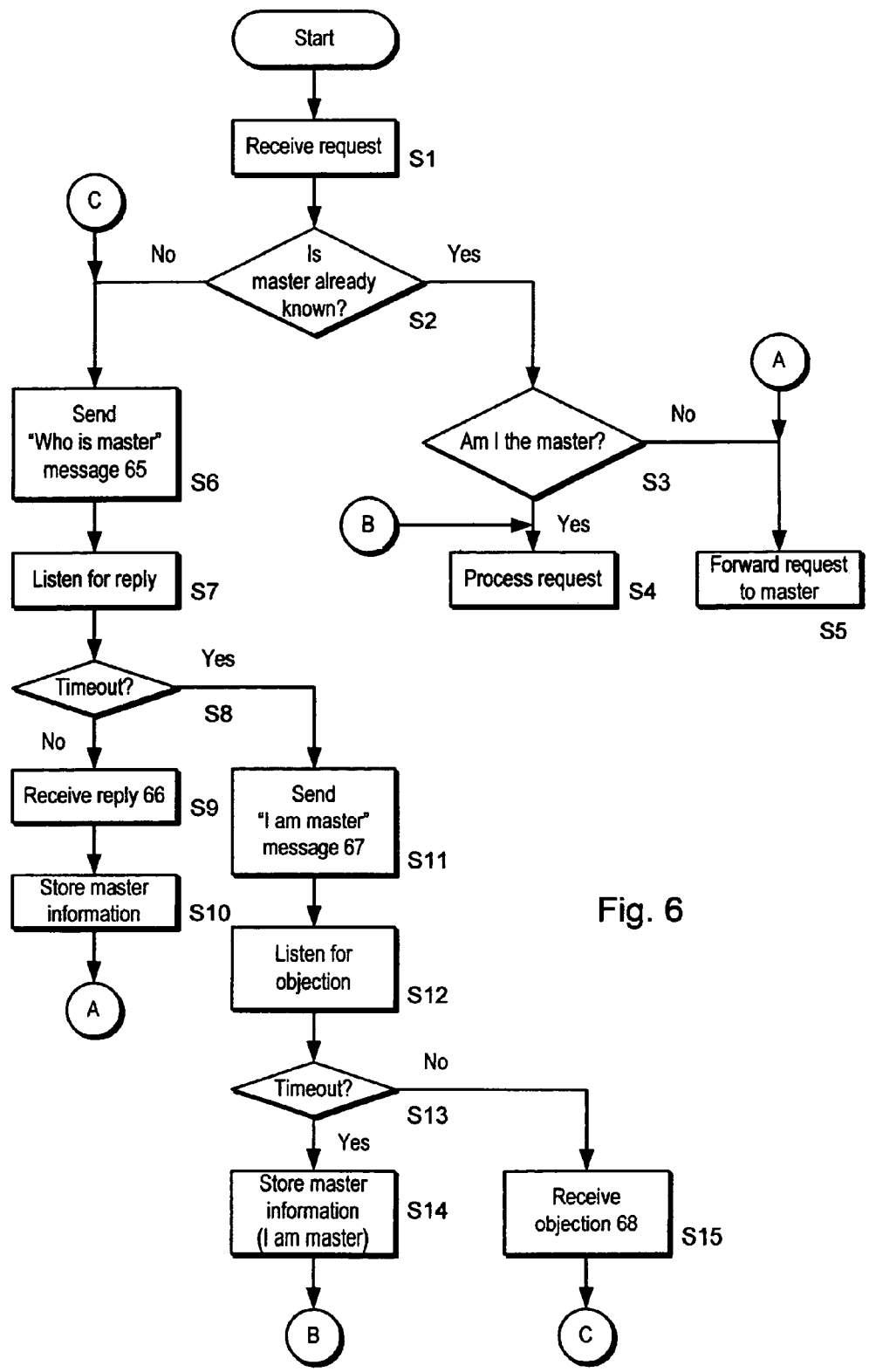
FIG. 6 is a process flow diagram of a method of operating an allocation manager.

Referring to FIGS. 4 and 6, the allocation manager 22 receives a request 48 (FIG. 5a) to allocate a cluster 27 (step S1). The allocation manager 22 checks whether the master allocation manager $22_M$ is known (step S2).

If the allocation manager 22 knows the identity of the master allocation manager $22_M$, then the allocation manager 22 determines whether it is the master allocation manager $22_M$ (step S3). If so, then the allocation manager 22 processes the request and selects a cluster 27 as described earlier (step S4). If not, then the allocation manager 22 forwards the request to the master allocation manager $22_M$ (step S5). The allocation manager 22 receives a cluster identifier from the master allocation manager $22_M$.

If the allocation manager 22 does not know the identity of the master allocation manager $22_M$, then the allocation manager 22 sends a query 65 to the other allocation manager(s) 22 asking for the identity of the master (step S6). The allocation manager 22 waits for replies (step S7) and checks whether the query "times out", i.e. whether a response is received before a predetermined period elapses (step S8).

If the allocation manager 22 receives a reply 66 before the query times out, then it stores the identity of the master allocation manager $22_M$ (step S9) and forwards the request to the master allocation manager $22_M$ (step S5).

If the allocation manager 22 does not receive any reply before the query times out, then it sends a message 67 asserting that it is the master (step S11). The allocation manager 22 waits for objections (step S11) and checks whether the message 67 times out (step S12).

If the allocation manager 22 does not receive any objection before the request times out, then it records itself as the master allocation manager $22_M$ (step S13) and processes the request to select a cluster (step S4).

If, however, the allocation manager 22 receives an objection 68, then it re-sends an identification query 65 to the other allocation managers 22 (step S6).

The allocation manager 22 continuously listens for queries 65 and messages 67.

If it receives a query 65 or a message 67 and it is the master allocation manager $22_M$, then it sends a response 66 or an objection 68 respectively. A master allocation manager $22_M$ can be relegated if it receives a message 67 from another allocation manager 22 or if the file service provider 5 is de-activated, for example shut down.

Writing (Updating File)

Figure 7A:
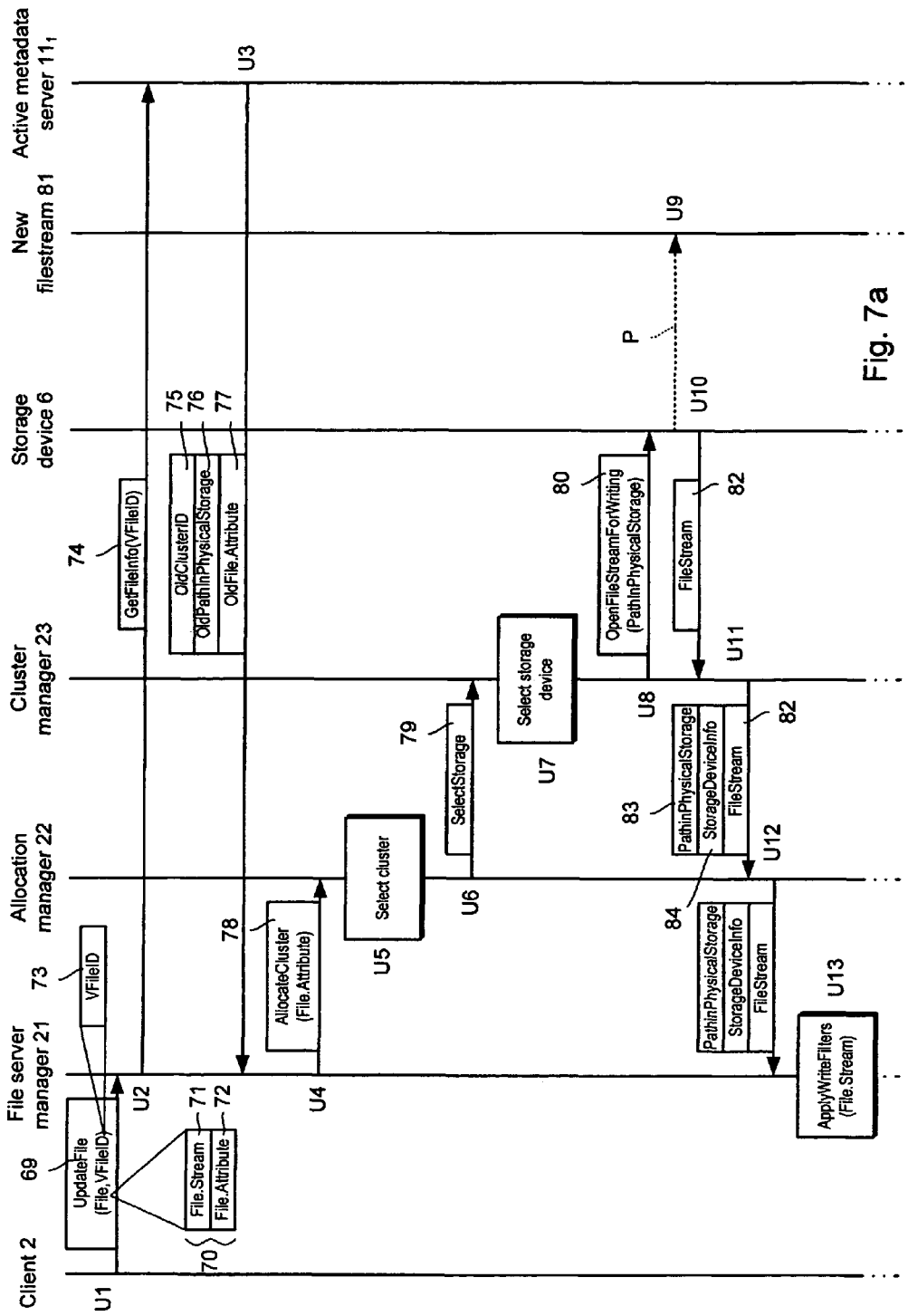

Referring to FIGS. 4, 7a and 7b, a file update process will now be described.

The file update process is similar to the file writing process described earlier. In short, the allocation manager 22 frees space allocated to an older version of a file, allocates space to a newer version of the file and writes the newer version of the file, as if it were a newly created file.

The client 2 sends a file update request 69 to the file service manager 21 of a file service provider 5 (step U1). The file write request 69 includes an updated file 70, including a new file data 71 and new file attributes 72, and a virtual file identifier 73 for an old file, for example the previously stored file 47.

The file service manager 21 sends a query 74 to the active metadata server $11_1$ to find out which cluster 27 the old file is stored (step U2). Alternatively, the file server manager 21 may send the query 74 to the passive metadata server $11_2$. The active metadata server $11_1$ returns an old cluster identifier 75, a path 76 in the storage device 6 and old file attributes 77 (step U3).

The updating process (steps U4 to U22) proceeds in a similar way to steps W2 to W20 of the writing process described earlier.

The file service manager 21 forwards a cluster allocation request 78 to the allocation manager 22 (step U4) and the master allocation manager $22_M$ selects a cluster 27 (step U5).

The allocation manger 22 sends an instruction 79 to select a storage device 6 within the selected cluster 27 (step U6). The cluster manager 23 selects a storage device 6 (step U7). The cluster manager 23 sends an instruction 80 to the storage device 6 to create a new filestream 81 having a given path in the storage device 6 (step U8). The storage device 6 creates a filestream 81 (step U9) and passes a new file handler identifier 82 to the cluster manager 23 (step U10). The cluster manager 23 returns the new filestream 81, a corresponding path 83 and cluster identity 84 to the allocation manager 22 (step U11). The allocation manager 22 forwards this information to the file service manager 21 (step U12).

The file service manager 21 applies writing filters to the new file data 71 (step U13) and writes a new filtered file data 85 to the open filestream 81 (step U14).

Once the new filtered stream 85 has been written, the file service manager 21 sends an instruction 87 to the cluster manager 23 to close the filestream 81 (step U15). The cluster manager 23 sends an instruction 88 to the storage device 6 to close the filestream 81 (step U16). The storage device 6 writes an end of file (EOF) marker 89 to the filestream 81 (step U17), frees the pointer and updates the storage device file system allocation table (not shown).

The cluster manager 23 triggers replication of the filestream 81 in other storage devices 6 in the same cluster 27 by sending an instruction (not shown) to the replication service 24 (FIG. 2) (step U18).

The file service manager 21, via metadata server interface 25, sends an instruction 90 to the metadata server $11_1$ to write updated metadata, as necessary (step U19). The metadata server $11_1$ writes the updated file information (step U20) and returns a new virtual file identifier 91 to the file service manager 21 (step U21). The file service manager 21 sends confirmation 92 to the client 2 that the file has been written (step U22).

The file service manager 21 sends an instruction 93 to the cluster manager 23 to delete the old file (step U23). The cluster manager 22 finds the storage device 6 storing the old filestream (step U24) and sends an instruction 94 to the storage device 6 to delete the old filestream (step U25). The cluster manager 23 triggers replication of the storage device 6 (step U26).

Reading

Figure 8:
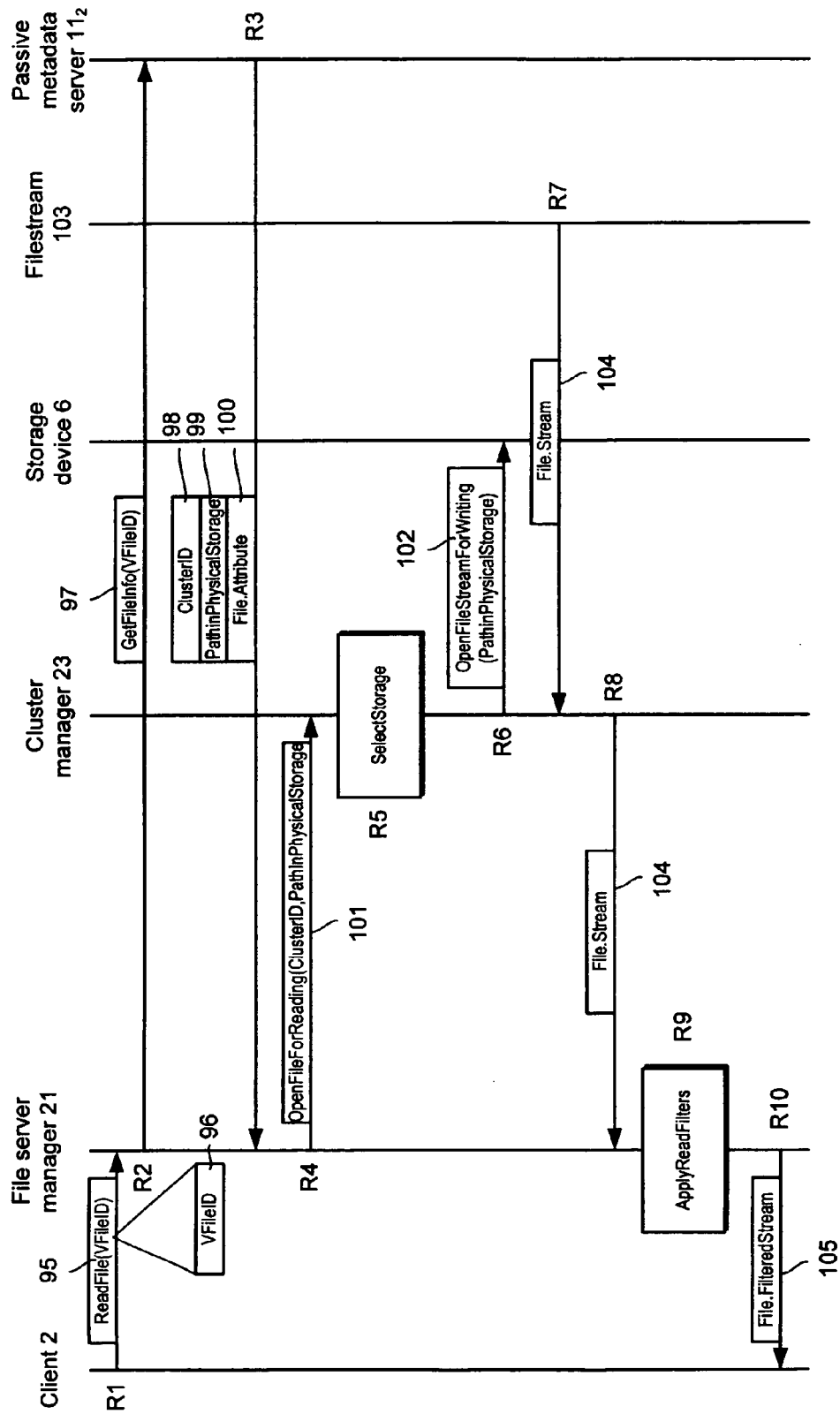
FIG. 8 illustrates a file reading process performed in the system shown in FIG. 4.

Referring to FIGS. 4 and 8, a file read process will now be described.

The client 2 sends a file read request 95 to the file service manager 21 of a file service provider 5 (step R1). The file read request 95 includes a virtual file identifier 96 for a file, for example the previously stored file 42 or the updated file 68.

The file service manager 21 sends a query 97 to the passive metadata server $11_2$ to find out which cluster 27 the file is stored (step R2). The file server manager 21 may send the query 97 to the active metadata server $11_1$.

The passive metadata server $11_2$ returns a cluster identifier 98, a path 99 in the storage device 6 and file attributes 100 (step R3).

The file service manager 21 sends a request 101 to the cluster manager 23 to select a storage device 6 (step R4). The cluster manager 23 selects a storage device 6 within the cluster 27 identified by the cluster identifier 98 according to highest network availability (step R5) and sends and instruction 102 to the storage device 6 to open a filestream 103 (steps R6). If the cluster manager 23 fails to access the storage device 6, then it refers to the logical cluster relationship table 32 to determine if the cluster 27 is mirrored or archived. If so, the cluster manager 23 sends a new instruction (not shown) to another storage device 6. The storage device 6 retrieves file data 104 from the filestream 99 and forwards it to the cluster manager 23 (step R7). The cluster manager 23 passes the file data 104 to file service manager 21 (step R8). The file service manager 21 applies reading filters to the file data 104 (step R9) and forwards a filtered filestream 105 to the client 2 (step R10).

As explained earlier, a user may grant access privileges to other users, referred to as "share viewers". The user can grant access privileges to a share viewer and notify the share viewer of the location of a file or folder by e-mailing or texting a message to the share viewer which includes a link, for example in the form of a uniform resource locator (URL) which identifies a file service provider 5 and the virtual file, for accessing the file or folder. The share viewer selects the link, thereby sending a request to the file service provider 5 to retrieve the file or folder.

The system 1 hereinbefore described can be used to provide a file service regardless of storage infrastructure. It can provide distributed file input and output over a consolidated storage space with pluggable stream handling over redundant sites.

The file service can be provided by mobile telephone network providers to users having mobile telephone handsets, by technology integrators and by companies.

The system 1 decouples file metadata from file data and unites real file systems, i.e. storage devices, so that they appear as a single storage unit. This can help to minimise or circumvent storage device limitations, such as storage capacity, storage device throughput and so on.

The system 1 can handle filestreams and need not divide filestreams into blocks for handling.

It will be appreciated that many modifications may be made to the embodiments hereinbefore described.

The invention claimed is:

1. A computerized file service server for managing access to distributed storage comprising a plurality of storage devices, the file service server comprising memory and at least one processor in communication with the memory, the file service server configured to communicate with at least one other file service server so as to determine which one of the file service servers selects a portion of distributed storage to be used when storing data and to cause data to be stored in the selected portion of distributed storage.

2. A file service server according to claim 1, the file service server further comprising:
   a first controller for receiving a request to store data in the distributed storage from a client; and
   a second controller for selecting the portion of the distributed storage to use when storing the data, the second controller configured to communicate with at least one other second controller, each second controller provided by a respective file service server, so as to determine which one of the second controllers selects the portion of distributed storage to use.

3. A file service server according to claim 2, the file service server configured to select one of the storage devices within the portion of the distributed storage.

4. A file service server according to claim 3, the file service server configured, after the file has been stored in the one storage device, to cause the data to be replicated in other storage devices within the portion of the distributed storage.

5. A file service server according to claim 2, the file service server further comprising:
   a third controller for selecting one of the storage devices within the portion of distributed storage in response to an instruction from the second controller.

6. A file service server according to claim 1, the file service server configured, in response to a determination that another file service server is to select the portion of distributed storage to be used, to receive identity of the portion of the distributed storage from the other file service server.

7. A file service server according to claim 1, the file service server configured, in response to a determination that it is to select the portion of distributed storage to be used, to select the portion of distributed storage.

8. A file service server according to claim 1, the file service server configured, after the data has been stored, to transmit information relating to the data to a metadata server.

9. A file service server according to claim 8, the file service server configured to receive a virtual file identifier corresponding to the data from the metadata server.

10. A file service server according to claim 9, the file service server configured to transmit the virtual file identifier to the client.

11. A file service server according to claim 1, the file service server configured, in response to a request to read or update a file, to transmit a request for information relating to the file to any one of at least one metadata server.

12. A file service server according to claim 1, wherein at least one of the storage devices is provided by a remote storage system.

13. A file service server according to claim 12, wherein the remote storage system comprises a storage access network.

14. A distributed storage management system comprising:
   a plurality of file service servers according to claim 1; and
   a metadata server for storing information about files stored in the distributed storage.

15. A distributed storage management system according to claim 14, wherein the metadata server is separate from the access-managing servers.

16. A distributed storage management system according to claim 14, further comprising at least one further metadata server, wherein the file service servers are each configured to send information relating to files to the metadata server, but not to the at least one further metadata server.

17. A distributed storage management system according to claim 16, wherein the access-managing servers are each configured to send requests for information relating to files to any of the at least one further metadata server.

18. A distributed storage system comprising:
   a distributed file management system according to claim 14; and
   distributed storage comprising a plurality of storage device.

19. A distributed storage management system according to claim 18, wherein the storage devices include plural types of storage device.

20. A computerized file service server for managing access to distributed storage comprising a plurality of storage devices, the file service server comprising:
   memory;
   at least one processor in communication with the memory;
   a file service manager for receiving a request to store data in the distributed storage from a client; and
   an allocation manager for selecting the portion of the distributed storage to be used when storing the data, the allocation manager configured, in response to an instruction from the file service manager, to communicate with at least one other allocation manager, each allocation manager provided by a respective file service server, so as to determine which one of the allocation managers selects the portion of distributed storage to be used when storing the data, the file service manager further configured to cause data to be stored in the portion of distributed storage.

21. A file service server according to claim 20, the file service server further comprising:
   a cluster manager;
   the cluster manager configured, in response to an instruction from the allocation manager, to select one of the storage devices within the portion of distributed storage to store the data.

22. A method of operating a computerized file service server for managing access to distributed storage comprising a plurality of storage devices, the method comprising:

communicating with at least one other file service server so as to determine which one of the file service servers selects the portion of distributed storage to be used when storing data; and causing the data to be stored in the portion of distributed storage.

23. A method according to claim 22, comprising a first controller receiving the request to store data in the distributed storage and a second controller communicating with at least one other second controller so as to determine which one of the second controllers selects the portion of distributed storage to be used.

24. A method according to claim 22, comprising determining that another file service server is to select the portion of distributed storage to be used and receiving identity of the portion of the distributed storage to be used from the other file service server.

25. A method according to claim 22, comprising determining that the file service server is to select a portion of distributed storage to be used and selecting a portion of the distributed storage to be used.

26. A method according to claim 22, further comprising selecting one of the storage devices within the portion of the distributed storage to be used.

27. A method according to claim 26, further comprising, after the file has been stored in the one storage device, causing the file to be replicated in other storage devices within the portion of the distributed storage.

28. A method according to claim 22, comprising transmitting information relating to the file to a metadata server after the file has been stored.

29. A method according to claim 28, comprising receiving a virtual file identifier corresponding to the file from the metadata server.

30. A method according to claim 29, comprising transmitting the virtual file identifier to the client.

31. A method according claim 22, comprising receiving a request to read or update a file and transmitting a request for information relating to the file to any one of at least one metadata server.

32. A method according to claim 22, comprising storing the data in a selected portion of distributed storage.

33. A computer-readable medium storing a computer program comprising instructions which, when executed by a computer, causes the computer to perform a method according to claim 22.

* * * * *